United States Patent [19]

Garagnon

[11] 4,047,231
[45] Sept. 6, 1977

[54] HIGH STABILITY DIGITAL HEAD SERVO FOR VIDEO RECORDERS

[75] Inventor: Gary B. Garagnon, Redwood City, Calif.

[73] Assignee: Ampex Corporation, Redwood City, Calif.

[21] Appl. No.: 668,418

[22] Filed: Mar. 19, 1976

[51] Int. Cl.² .................. H04N 1/28; G11B 21/04
[52] U.S. Cl. .................................... 360/36; 360/70
[58] Field of Search .................. 360/36, 73, 70, 84

[56] References Cited

U.S. PATENT DOCUMENTS

| | | | |
|---|---|---|---|
| 3,017,462 | 1/1962 | Clark et al. | 360/36 X |
| 3,097,267 | 7/1963 | Clark et al. | 360/70 |
| 3,187,092 | 6/1965 | Shashoua et al. | 360/70 |
| 3,270,130 | 8/1966 | Hurst et al. | 360/70 |
| 3,542,950 | 11/1970 | Luther, Jr. et al. | 360/70 |
| 3,729,583 | 4/1973 | Yano | 360/70 X |

Primary Examiner—John H. Wolff
Attorney, Agent, or Firm—Ralph L. Mossino

[57] ABSTRACT

A servo system is disclosed for use with a motor such as the drive motor for the head wheel of a recording and reproducing apparatus, for example. The servo system utilizes a phase comparator to phase lock a feedback signal supplied by a motor tachometer and a reference signal to control the phase and speed of the drive motor. The reference signal is generated by a digital processor which is adapted to adjust the phase of the reference signal to a predetermined lead relative to a standard frequency source and also includes means for adding or subtracting incremental phase adjustments by comparing the phase of said tachometer signal with the phase of said standard frequency source and providing error signals in said incremental amounts for adjusting the resulting reference signal that is applied to the tachometer phase comparator.

10 Claims, 16 Drawing Figures

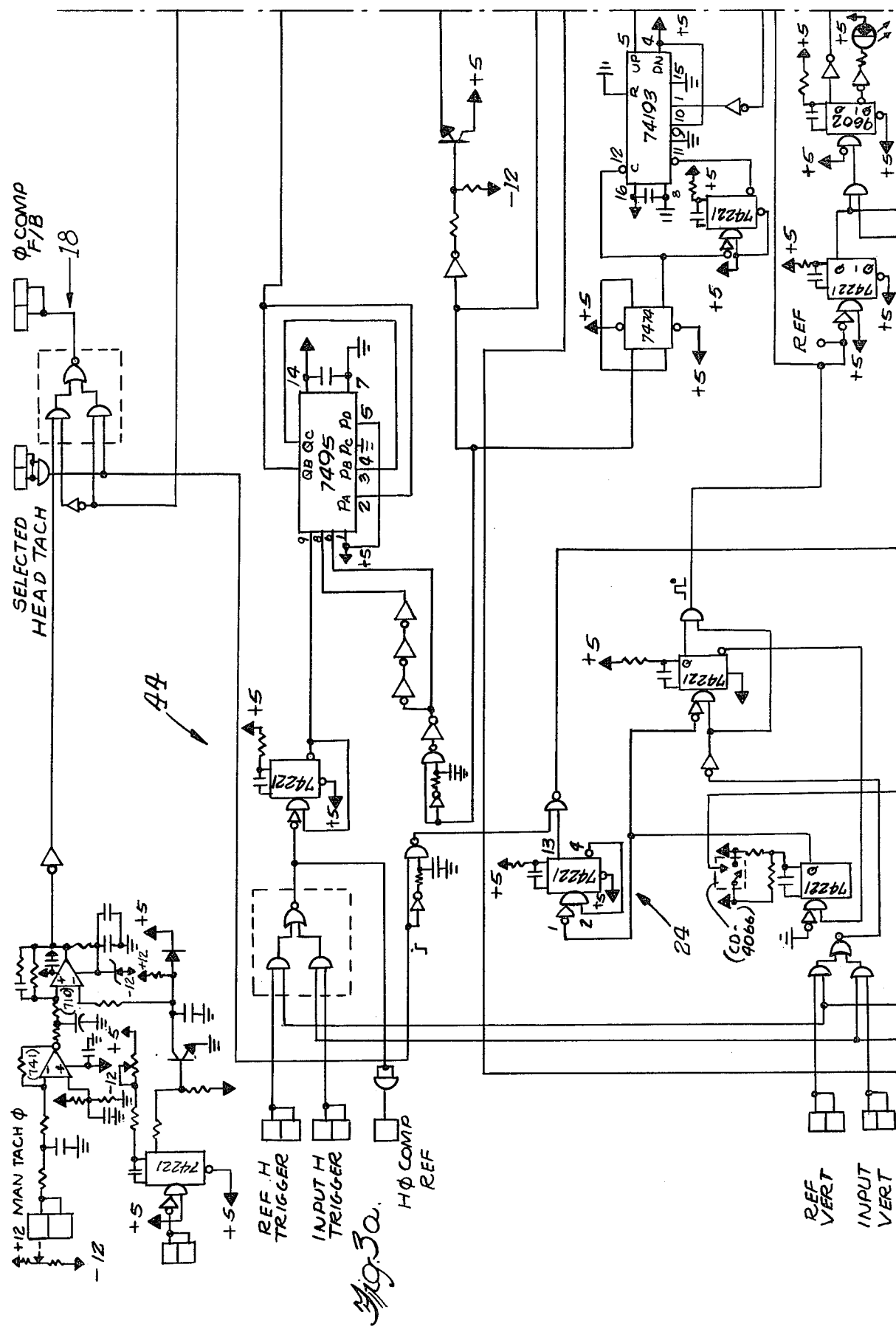

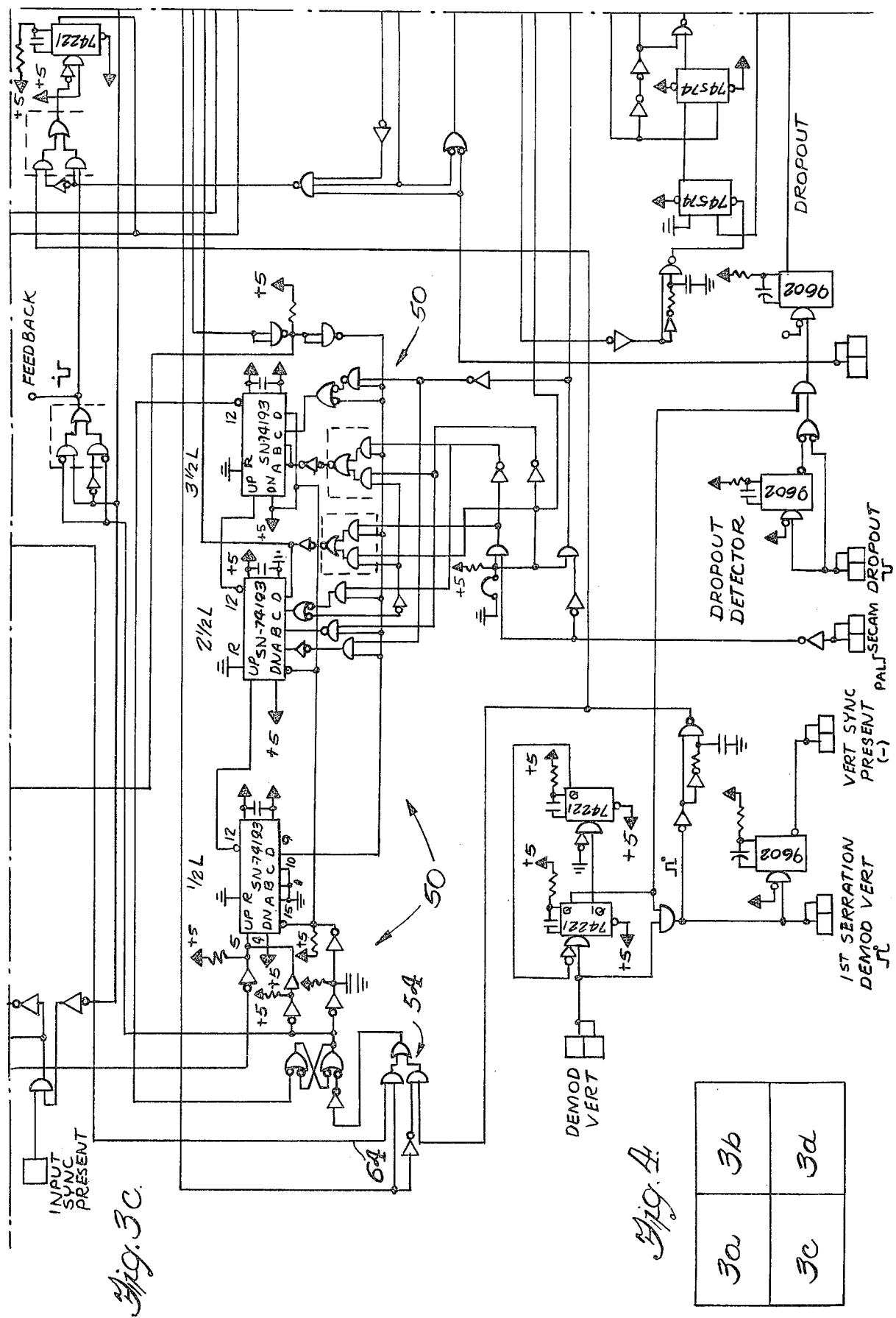

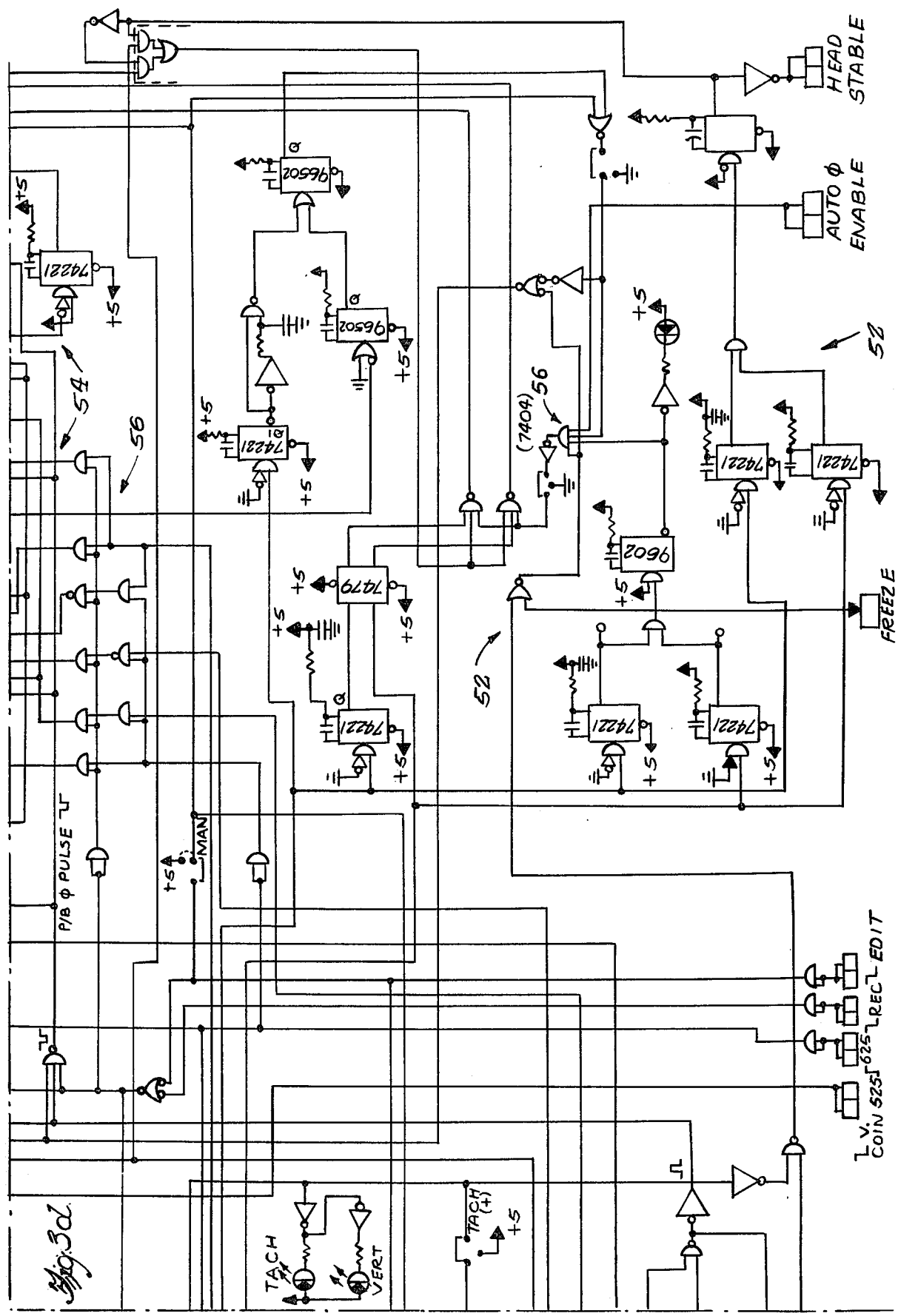

HIGH STABILITY DIGITAL HEAD SERVO FOR VIDEO RECORDERS

The present invention generally relates to servo control systems and, more particularly, to a servo system that is adapted to provide accurate phase control of an operating time variable for driven loads such as motors that may be used with recording and reproducing apparatus.

Servo systems for use in accurately controlling the speed, angular position and other controlled time variables of operation of motors have continued to be improved as a result of research and developmental efforts, particularly in the area of video recording and reproducing apparatus. Such recording apparatus requires much precision in controlling the speeds of the head wheel and capstan during recording and reproducing of video signals, particularly color video signals where time base stabilities on the order of about 4 nanoseconds may be desirable. While time base error correctors are successful in electronically processing the video signal to remove instabilites caused by the head wheel servo system, capstan servo system or tape path geometry, for example, such instabilities can detrimentally affect the video signal during editing, because during editing the time base corrector is not operated. For this reason accurate servo systems for use in the head motor control system is a matter of significant importance. The sophisticated servo systems currently in use are capable of providing stabilities during the recording process of up to two microseconds while using the sampling rate that is based on the 60 hertz vertical rate of the video signal. Since most of the prior art head servo systems utilize the 60 hertz sampling rate, they were somewhat restricted in their bandwidth in that only about 5 to 6 hertz was all that could be accommodated in the servo loop without compromising the necessary phase margin. This had a detrimental effect on the record and edit stability and, for that reason, record stabilities of no more than about two microsecond peak-to-peak approached the limit. The stability is also affected by noise that can be injected by the velocity loop.

Accordingly, it is an object of the present invention to provide an improved servo system that has superior stability due to the use of a highly stable reference source and increased loop bandwidth.

Yet another object of the present invention is to provide an improved servo system that is particularly adapted for use in video recording and playback apparatus and the like.

Other objects and advantages will become apparent upon reading the following detailed description, while referring to the attached drawings, in which:

FIGS. 3a-3d represent specific electrical schematic diagrams of circuitry that may be used to carry out the operation of the schematic block diagram shown in FIG. 1; and, FIG. 4 represents a chart illustrating the manner in which FIGS. 3a-3d can be arranged to form a single composite electrical schematic diagram.

Broadly stated, the present invention is directed to a servo control system which is particularly adapted for use with controlling the speed and phase of a head wheel of a recording apparatus, for example, such as a quadruplex format videotape recorder or the like. In videotape recorder applications, the servo system utilizes a sampling rate that is four times higher than the video signal reference vertical signal that is typically used as the reference rate for feedback control loops in prior art apparatus. Since the sampling rate is increased by a ratio of about 4 to 1, the servo system achieves higher gain at low frequencies compared to systems that have a 60 hertz sampling rate. Moreover, rather than introducing correction in the feedback loop for such things as lead time for compensating for the delay that is produced by the time base corrector in videotape recording apparatus, the reference side of the phase comparator in the basic servo loop is adjusted for the necessary compensating lead and auto phasing functions are also accomplished in the reference loop. Since the reference loop utilizes digital techniques and a very high frequency clock which is phase locked to a standard frequency source such as the horizontal station sync or network sync or the like, a highly stable reference clock signal is used to accomplish the auto phasing correction and, by virtue of the extremely small time increments that are utilized as the correction increments, the digital control of the reference signal phase is of extremely high resolution. Moreover, by selectively introducing time or phase lead in the reference path, the precise number of lines of lead time to compensate for the delay in the time base correcting circuitry is accomplished.

Figure 1:
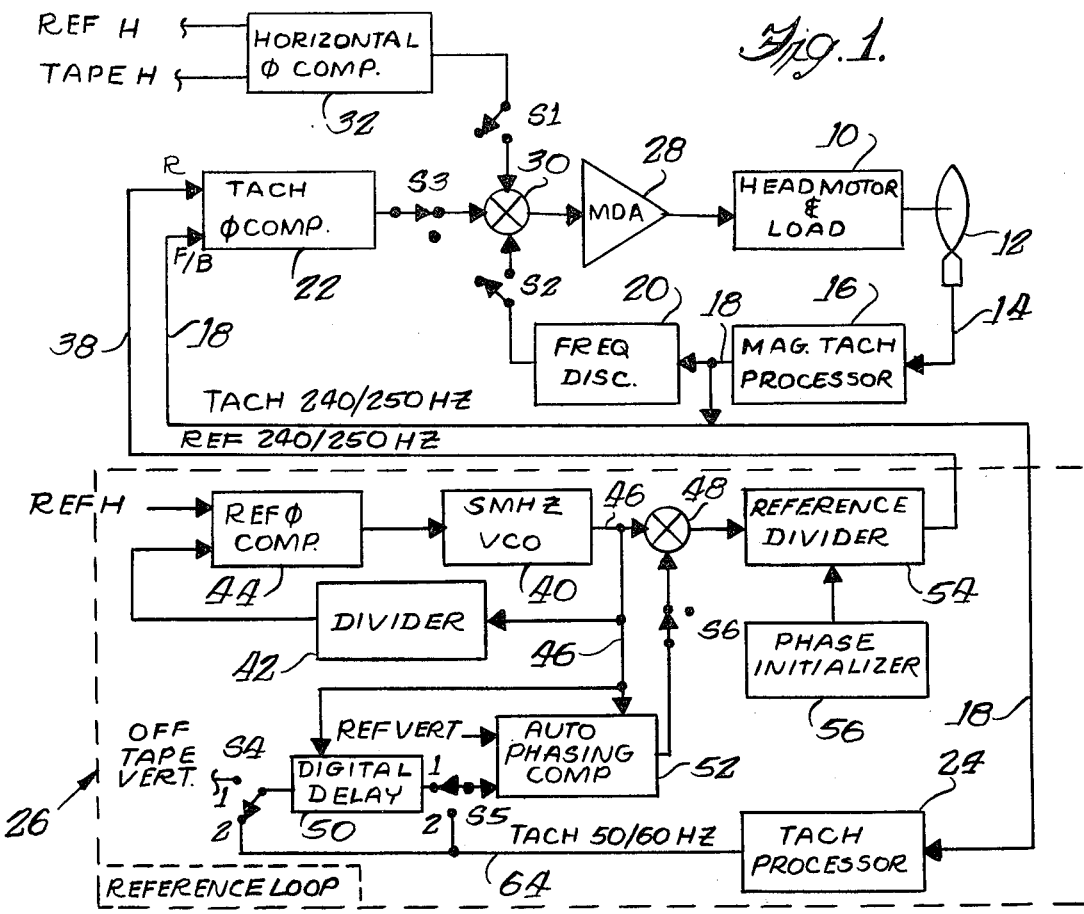
FIG. 1 is a schematic block diagram of servo system embodying the present invention.

Turning now to the drawings and particularly FIG. 1, there is shown a schematic block diagram of apparatus embodying the present invention, and including a driven load or head motor and load 10, which may comprise a head wheel carrying a number of transducing heads in a recording and playback apparatus, for example, although the servo system embodying the present invention is also adapted for use in other applications that are not necessarily related to the particular embodiment shown and described herein. The speed and phase of the head motor 10 is derived from a tachometer means, schematically illustrated at 12, which provides an electrical signal via line 14 to a magnetic tachometer processor 16 having an output 18 that is applied to a frequency discriminator 20 as well as to a tachometer phase comparator 22 and a tachometer processor 58 located within a reference loop processor, indicated generally at 26 within the dotted lines as shown. The head motor 10 is driven by a motor drive amplifier 28 which has its input supplied by a summing junction or summer 30. The summer 30 has a horizontal phase comparator 32 connected via switch S1 thereto and the frequency discriminator 20 is connected to it through switch S2. Similarly, the tachometer phase comparator 22 is connected by switch S3 to the summer 30.

As previously mentioned, many prior art video recorder servo utilize the vertical rate from the video signal which is the first serration in the vertical interval of the video signal which repeats every field and therefore occurs at a 60 hertz rate. Thus, such prior art tachometer servo systems used a tachometer phase comparator that utilizes the vertical sync as the reference signal and the feedback side is supplied by the head tachometer. Since the head tachometer of a quadruplex format recorder supplies a 240 hertz signal, it has been necessary to divide the tachometer output by 4 to produce a rate that was compatible with the 60 hertz rate from the vertical sync of the video signal. The present invention utilizes the tachometer rate of 240 hertz as the feedback input to the tachometer phase comparator 22 and a reference frequency of 240 hertz that is generated by the reference loop processor 26 shown within the dotted lines. In this regard, it should be understood that the 204 hertz tachometer rate is the tachometer rate that is produced using the NTSC 525 line standard used in the United States and that a 250 hertz tachometer rate would be present for a SECAM or PAL 625 line standard signal that is used in many other countries in the world. By utilizing the 240 hertz sampling rate, the rate is effectively increased by a factor of 4 to 1 which permits more gain to be achieved in the control feedback loop. Since the sampling rate in such prior art systems was at a frequency of 60 hertz, to achieve a unity gain crossover of at least one decade below the sampling rate which is necessary to maintain a safe phase margin, the low frequency gain was not particularly high. By utilizing a sampling rate of 240 hertz, the unity gain crossover of one decade below the sampling rate permits a unity gain at 24 hertz so that a typical graph of the two situations results in a substantial increase in gain at low frequencies.

With respect to the operation of the servo system, during start-up of the head wheel, the frequency discriminator 20 is connected in the loop by closing switch S2 and the tachometer phase comparator is also connected by reason of S3 being closed as well. The frequency discriminator 20 is then disconnected when the head wheel is running at the desired speed. The frequency discriminator is switched out to eliminate the injection of unwanted noise components which are outside of the bandwidth of the basic tachometer comparator loop and which may otherwise produce short term instability. When the head motor is operating at speed, S2 is opened and the tachometer phase comparator 22 provides the basic control to the motor drive amplifier 28 which drives the head motor 10. With respect to the horizontal phase comparator 32, it is switched in and out via switch S1 as desired to accomplish the intended purpose. Thus, when it is desired to perform an edit, the horizontal phase comparator 32 is the controlling loop and is switched in to the loop as the edit point is approached. When the edit point is reached, the switch S1 is opened and S3 closed so that the control switches from the horizontal phase comparator to the tachometer phase comparator so that the tachometer phase comparator loop is used during the body of the edit. The use of the horizontal phase comparator in the above described switching operation during editing is conventional as in the use of a frequency discriminator in the start-up of a motor.

In accordance with an important aspect of the present invention and referring to the reference loop processor 26, the increased stability of the servo system embodying the present invention is achieved by generating a highly stable reference signal which is applied from the reference loop 26 via line 38 to the reference input of the tachometer phase comparator 22. As previously mentioned, the feedback input of the tachometer phase comparator 22 is provided by the magnetic tach processor 16 through line 18 and a tachometer signal of 240 hertz (250 hertz for SECAM or PAL formats) is applied to the feedback input of the tachometer phase comparator. Since the tachometer phase comparator 22 compares the phase of the signal applied at the reference and feedback side and provides an error voltage at its output which is fed to the motor drive amplifier for correcting the phase of the head motor 10 so that the phase at the two compared inputs is in continuous phase locked synchronism, any adjustment in the reference input will result in a similar adjustment in the feedback side which is indicative of a change in phase of the head motor since the phase of the head motor is effectively locked to the reference phase.

Broadly stated, the reference loop processor 26 is adapted to generate a highly stable reference signal by phase locking a high rate clock source that is generated within the processor 26 to a standard frequency source such as the station horizontal sync or the like and by dividing the clock signal to produce the desired reference frequency of 240 hertz. Moreover, the stability of the reference signal is related to the period of the master clock signal which is preferably on the order of about 5 megahertz (MHz) so that the period is approximately 200 nanoseconds. The processor is adapted to incrementally increased or decrease the phase of the reference signal applied to the comparator by 200 nanosecond increments. Moreover, the reference 240 hertz signal permits the tachometer phase comparator 22 to operate with a bandwidth of about 20 hertz or better which provides adequate gain and stiffness (the ability to maintain speed and phase as an external disturbance is applied) of operation without the frequency discriminator 20 connected in the loop. With the increased bandwidth and disconnecting of the frequency discriminator 20, the short timing errors that are thought to be due to interactions between the control loops and the frequency components injected by the discriminator loop are not experienced.

The frequency discriminator 20 is adapted to provide an error voltage at the output thereof for controlling the motor drive amplifier 28 which is proportional to the difference in the frequency of a fixed reference and the feedback that is provided by the magnetic tachometer processor 16. Thus, the error voltage is reduced as the head motor 10 approaches speed and the frequency as measured by the tachometer approaches the reference frequency which is chosen to correspond to the proper speed in which the head motor is to be driven. Thus, after the frequency discriminator 20 performs the start-up function, its use is not particularly important, since the tachometer phase comparator 22 will thereafter control the phase of the head motor 10 which is much more precise speed control than the frequency control that is performed by the frequency discriminator. For these reasons, it is desirable that the frequency discriminator 20 be disconnected since it performs no vital function when the motor is running at speed and can only introduce noise components which may detrimentally affect the proper operation of the phase control loop.

Referring now to the reference loop processor 26 shown in FIG. 1, the processor is clocked at the high frequency of about 5 MHz which is generated by a voltage controlled oscillator 40 that is a part of a phase lock loop which has a divider 42, the output of which is one input to a reference phase comparator 44. The other input of the reference phase comparator 44 is provided by a standard frequency source or rate signal, such as station reference horizontal or the like. The reference horizontal signal is preferred since it represents the highest rate component available in the station composite sync signal and enables more gain and higher bandwidth to be used in the basic phase locked loop for generating the 5 MHz clock frequency. The output of the reference phase comparator 44 controls the voltage controlled oscillator 40 to thereby phase lock the clock output with reference horizontal. The clock output appears on line 46 which extends to an adding and subtracting junction 48. The line 46 also extends to and clocks a digital delay 50 and an auto phasing comparator 52. The 5 MHz clock signal is divided by a reference divider 54 the output of which is the output 38 of the reference loop processor 26. A phase initializer 56 presets the divider 54 to adjust the phase of the loop by a predetermined amount to compensate for delays that are introduced by a time base corrector which is used elsewhere in a recording and reproducing apparatus.

For the reference loop processor 26 to properly adjust the phase of the reference signal on line 38 to correct the phase of the head due to errors or fluctuations that may arise due to temperature sensitivity, changes in head loading, drift, or the head tips protruding farther than normal into the tape during operation, for example, the processor 26 is adapted to take out such fine errors by incrementally adjusting the reference phase in the following manner. The auto phasing comparator 52 is adapted to compare a further standard rate signal or a reference vertical, such as station reference vertical of the video signal, with another input which is the headwheel tachometer signal when S5 is in position 2 as shown so as to compare the phase of the tachometer signal with the reference vertical phase. It should be understood that both of these signals are 60 hertz when the NTSC system is used and would be 50 hertz for SECAM or PAL standards used in many other countries. To provide the 60 hertz signal, the 240 hertz tachometer signal from the magnetic tachometer processor 16 is applied to the tachometer processor 24 which converts the high frequency 240 hertz signal to the desired 60 hertz rate.

Figure 2:
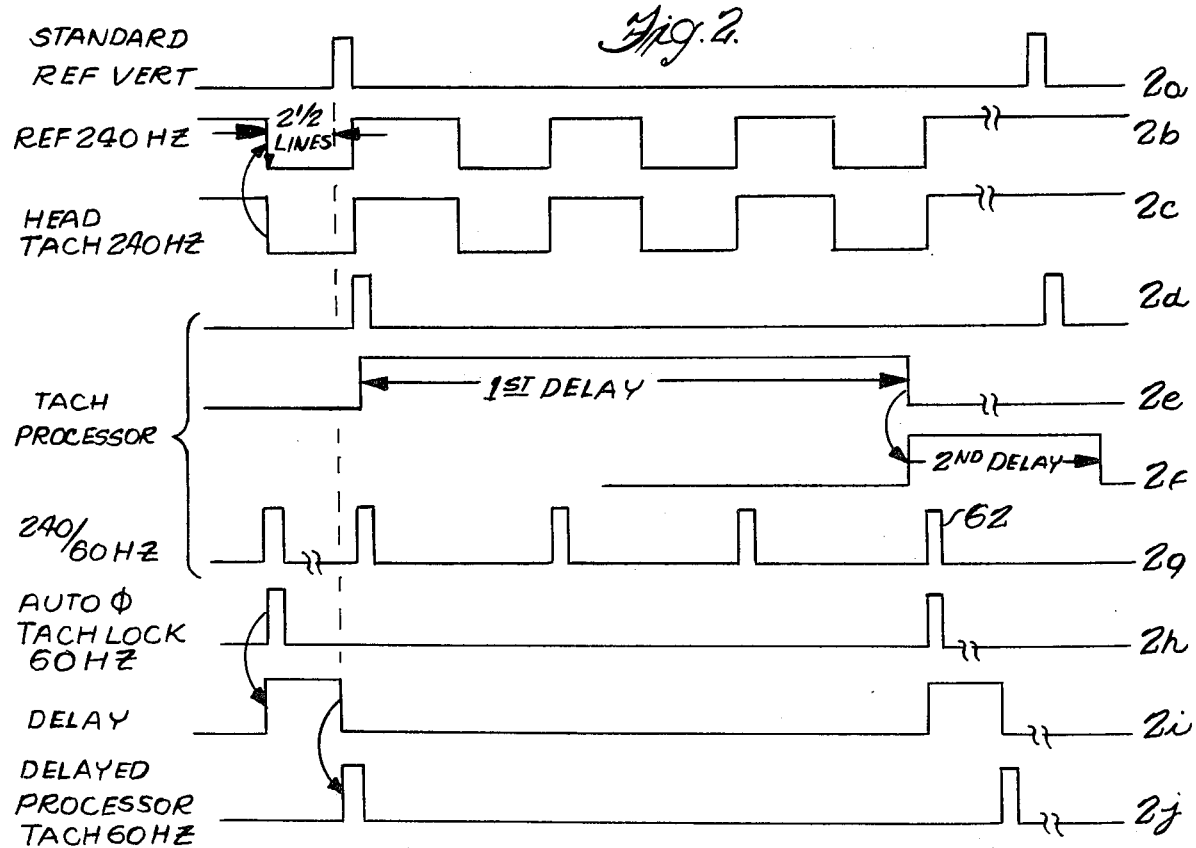
FIGS. 2a-2j represents timing diagrams that are produced at various locations of the block diagram shown in FIG. 1.
Figure 3B:
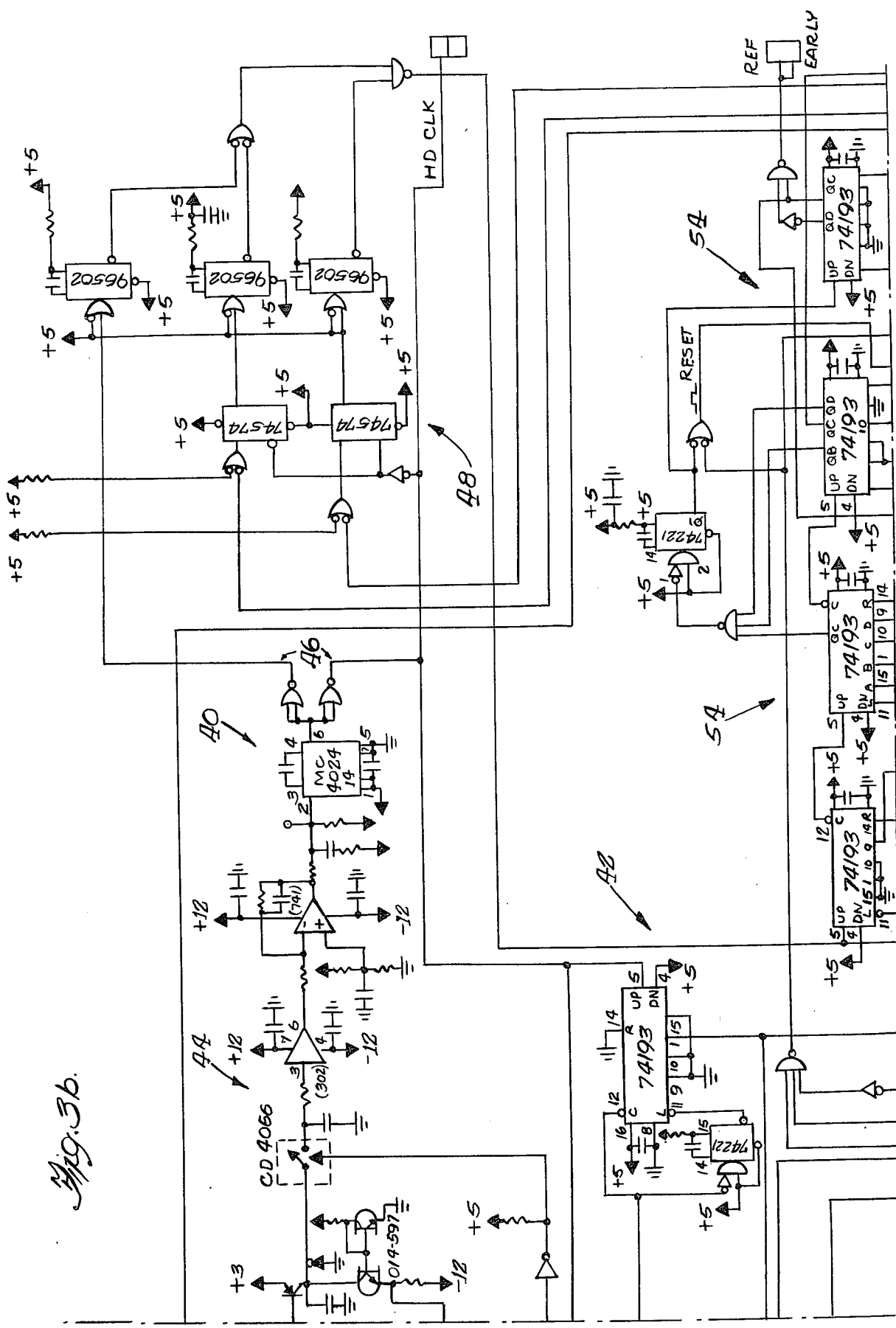

To describe the manner in which the 60 hertz rate is achieved, reference is made to FIG. 2, which illustrates a series of waveforms 2a-2j which are present at various locations in the servo system illustrated by the block diagram of FIG. 1 during operation. The standard reference vertical shown in FIG. 2a is a 60 hertz signal that is derived from the station reference vertical and it is used to trigger other circuitry as will be described. The reference 240 hertz square wave is shown in FIG. 2b and provides the reference input to the tachometer phase comparator 22 as previously mentioned. Since the head tachometer signal is also occurring at a 240 hertz rate and is phase locked by the phase comparator 22, it is also a square wave that is in step with the reference 240 signal as shown by comparing the waveform of FIG. 2c with that of FIG. 2b. The arrow on the first serration from FIG. 2c to FIG. 2b is illustrative of the locked phase condition that is desired. The trailing edge of the standard reference vertical signal is used to provide a pulse which also necessarily occurs at the 60 hertz rate and it is shown in the waveform in FIG. 2d which is used within the tachometer processor 24 to trigger a delay producing component, such as a monostable multivibrator or the like. The multivibrator preferably has a first delay (see FIG. 2e) that extends for a time duration that approaches the next occurrence of the standard reference vertical pulse and the end of the first delay triggers a second shorter duration delay producing component in the tachometer processor 24 which forms a window (FIG. 2f) of a predetermined time which enables a NAND gate or the like in the tachometer processor 24 to fire at the occurrence of the 240 hertz tachometer signal if it occurs within the window. Thus, the occurrence of the pulses 62 (FIG. 2g) within the windows of the second delay effectively converts the 240 hertz signal to a 60 hertz signal as is desired for use by the auto phasing comparator 52 which compares the 60 hertz tachometer signal with the 60 hertz reference vertical signal. It should be appreciated that the tachometer processor 24 is not a divider, but merely permits every pulse i.e. the pulse that appears in the window, to generate a pulse as shown in FIG. 2h. The tachometer output appears on line 64 which is applied directly to the auto phasing comparator 52 if switch S5 is in the position 2 which would occur when the recording apparatus is operating in either a RECORD or EDIT mode.

If the apparatus is in the READY/STANDBY mode, the switch S4 is in position 2 as shown and switch S5 is switched to the position 1. This causes the tachometer signal on line 64 to be applied to a digital delay circuit 50 which introduces a delay into the tachometer signal before it is applied to the auto phasing comparator 52 and the delay is chosen to correspond with the amount of lead that is introduced into the reference signal line 38 by the reference divider 54 and phase initializer 56 which will be discussed hereinafter. In any event, the digital delay will last for the time required to scan ½ of a television line, 2½ television lines or 3½ lines which correspond with a similar number of lines of delay in a time base corrector depending upon the system that is utilized. In this regard, the 2½ lines of delay are provided for use in the NTSC and PAL standard, 3½ lines for SECAM and ½ for special purposes. It should be understood that the amount of delay introduced by delay 50 is to correspond with the amount of lead that is introduced by the reference divider 54 so that the auto phasing comparator 52 will compare the station reference vertical with the phase of the tachometer signal. Since there is a lead introduced during the READY/STANDBY modes as well as during the PLAY mode, the tachometer signal must be delayed before being applied to the auto phasing comparator to reflect the lead that is provided in the reference signal by the reference divider 54 and phase initializer 56. When the recording apparatus is placed in the READY/STANDBY condition, the head is brought up to speed and the videotape is not moved so that when the PLAY button is started it will immediately begin operating. When the PLAY button is depressed, switch S4 is in position 2 as shown and remains there until the capstan and head servo systems have settled down which may take about 2 seconds, whereupon it switches to position 1 where the tachometer signal is no longer used, the off-tape vertical information from the video signal being compared against the reference vertical by the auto phasing comparator 52 after having experienced the delay from digital delay circuit 50.

With respect to the operation of the auto phase comparator 52, it is adapted to servo out any errors due to circuit offsets or head loading, for example, by digitally phase shifting the reference 240 signal on line 38 in 200 nanosecond steps at a rate of one step every eight milliseconds until coincidence is achieved between the reference vertical and the feedback signal which is applied through switch S5 from either the undelayed tachometer signal, the delayed tachometer signal or the off-tape vertical signal. The errors can be reduced to plus or minus ⅜ of a microsecond with the use of the 200 nanosecond steps of the 5 MHz clock signal. When coincidence is achieved, i.e., the reference vertical pulses overlap the pulses applied to the other input through S5, the auto phaser comparator effectively disconnects which is diagrammatically illustrated by switch S6 being switched to the open position (not shown) which indicates that the phase errors have been reduced to plus or minus ¾ microsecond utilizing the auto phasing comparator.

The manner in which the adjustment is achieved is that the auto phasing comparator 52 either applies adding or subtracting pulses to the add or subtract junction 48 comprising digital logic circuitry which effectively adds or subtracts pulses from the pulse train originating at the output of the voltage controlled oscillator 40 which is applied to the reference divider 54. Since the reference divider 54 is comprised of a counter, the adding or subtracting of a pulse to the pulse train applied to the input thereof will cause the counter to be either advanced or retarded relative to the pulse train before the pulses were either added or subtracted, and the incremental adjustment thereby adjusts the phase of the 240 hertz reference signal that appears on line 38.

Stated in other words, if the reference divider provides a change of state of its voltage level for every 21,000 counts at its input, quickly inserting a count would cause the state to change earlier than it would have changed, in effect advancing the phase of the output signal by 1/21,000th.

Similarly, if a count was removed from the pulse train that is applied to the reference divider, it would require another count to reach the 21,000 number and, accordingly, the output would not change state until another count is received which, when compared with the original rate would have been 21,001 counts from the prior change of state of the output. In this manner, the phase of the output on line 38 is either advanced or retarded relative to the original phase and since the adjustment occurs only when the pulses or counts were added or subtracted from the pulse train, the change in phase is permanent i.e. the system retains the changed phase condition and can be said to have memory. For this reason, once the auto phasing comparator 52 makes the necessary correction, it can shut off and permit the servo system to operate at the adjusted phase relationship.

However, if the correct phase relationship is thereafter lost due to drift or the like, the auto phasing comparator will reconnect and provide the necessary phase correcting add or subtract pulses to the junction 48 for adjusting the phase of the reference so that the tachometer phase comparator 22 will adjust the phase of the head motor to correct for the error. In this connection, by using the 5 MHz basic clock rate and disconnecting the frequency discriminator after start-up of the head has been accomplished, the servo system is capable of obtaining stability of plus or minus 100 nanoseconds.

In accordance with another aspect of the present invention and referring to the reference divider 54 and phase initializer 56, and recalling that the reference signal preferably has a lead of ½, 2½ or 3½ television lines to accommodate the delay that will be inserted in the video signal as a result of passing through the time base corrector, the phase initializer 56 is adopted to preset the reference divider 54 at the beginning of every machine state such as a transition from ready to record, record to ready, to have the reference signal in the proper relationship relative to the reference vertical signal. In the regard, when the 5 MHz basic clock rate is used, the 21,000 counts at the input will produce a change of state at the output. This results in the reference frequency of 240 hertz as is desired. Although the 21,000 counts are required for each change of state of the divider output, the phase initializer 56 is adapted to preset or load the counter with an initial value greater than zero so that it will cause the phase to appear early. In this regard, for a 2½ line phase lead, the phase initializer 56 preferably preloads the counter in the reference divider 54 with a count of 160 which means that the counter need only receive 20,840 counts to experience a change of state which is the equivalent of the 2½ lines of phase lead that is desired.

One specific circuit which can be used to carry out the operation of the reference loop processor 26 portion of the block diagram of FIG. 1 is shown in FIGS. 3a–3d which may be combined in the manner shown in the chart of FIG. 4 to form a composite electrical circuit diagram. The logic symbols are conventional and where integrated circuits are illustrated, their standard industry designating numbers are shown either inside the blocks or in adjacent parentheses. Additionally, the pin numbers are included where appropriate, together with identification of appropriate pin numbers. The reference characters of the blocks in FIG. 1 are included, where appropriate, to identify the corresponding circuitry in FIG. 3. The specific operation of the circuitry of FIG. 3 is not included herein for the reason that it is apparent to one of ordinary skill in the art and operates substantially as described with respect to the block diagram of FIG. 1.

From the foregoing, it should be appreciated that an improved servo system for use with a driven load, for example, a motor such as a head wheel motor used in a quadruplex format recording and reproducing apparatus for example, has been described. The servo system represents an advance in the art because of the superior stability that is achieved, i.e., within plus or minus 100 nanoseconds. The present invention utilizes a stable high frequency clock signal which is processed to adjust the rate of a reference timing signal against which the feedback signal (indicative of the controlled operating time variable of the motor such as phase) is compared and the reference side rather than the feedback side is corrected for very small errors in the controlled operating time variable of the motor that occur as a result of head loading, temperature instability, drift and the like. The higher sampling rate that is utilized contributes to the increased stability and the overall operations of the servo system is such that video editing operations of high quality can be achieved in videotape recording and reproducing apparatus.

It is of course understood that although preferred embodiments of the present invention have been illustrated and described, various modifications, alternatives and equivalents thereof will become apparent to those skilled in the art and, accordingly, the scope of the present invention should be defined only by the appended claims and equivalents thereof.

Various features of the present invention are set forth in the following claims.

What is claimed is:

1. A servo system for regulating an operating time variable of a driven load comprising:
   means responsive to the driven load for providing a feedback signal at a rate that is proportional to the operating time variable of the load;

means responsive to a first standard rate signal for providing a reference signal of a rate which is equal in rate to that of said feedback signal, said first standard rate signal being related to the desired rate of rotation of the load;

first means for comparing said reference signal and said feedback signal and providing a first error signal indicative of the time difference between the rates of the compared signals;

means electrically coupling said first error signal provided by said comparing means to the load for driving the load such that said reference signal and said feedback signal are in locked synchronism; and control means responsive to said feedback signal and a second standard rate signal for incrementally adjusting the rate of said reference signal in accordance with time variations in said feedback signal, and said second standard rate signal having a rate substantially lower than said first standard rate signal and having a timing related to the desired position of the angular position of the load.

2. A servo system as defined in claim 1 wherein:

said reference signal providing means further includes means for generating a high rate pulse train clock signal that is phase locked to said first standard source rate signal and is at a substantially higher rate than said reference signal and dividing means operatively connected to the output of said clock signal generating means for providing a pulse of said reference signal in response to a predetermined number of pulses being received at the input thereof; and said control means further includes means coupled to said load responsive means for converting the feedback signal to a lower rate nominally equal to the rate of said second standard rate signal, second means for comparing the time difference between said converted feedback signal with said second standard rate signal and providing a second error signal at the output thereof that is coupled to said dividing means for incrementally altering the number of pulses in said pulse train of said clock signal applied to said dividing means, whereby said reference signal is phase corrected relative to said second standard rate signal.

3. A servo system as defined in claim 2 wherein said clock signal generating means comprises a voltage controlled oscillator connected in a phase locked loop, and said first standard rate signal is the horizontal sync component of a television signal.

4. A servo system as defined in claim 2 wherein said second comparing means further includes means for adding a pulse in said pulse train signal whereby the predetermined count occurs at a time earlier than its normal time; and means for subtracting a pulse from said pulse train clock signal so that the predetermined count occurs at a time later relative to its normal time, said pulses being added or subtracted as determined by said second error signal.

5. A servo system as defined in claim 4 wherein said second comparing means includes means for adding a pulse in said pulse train clock signal whereby the predetermined count occurs at a time earlier than its normal time and means for subtracting a pulse from said pulse train clock signal so that the predetermined count occurs at a time later relative to its normal time, said pulses being added or subtracted as determined by said second error signal.

6. A servo system as defined in claim 4 wherein each of said pulses that are added or subtracted from said pulse train represent a time increment of about 200 nanoseconds.

7. A servo system as defined in claim 4 wherein said second standard rate signal comprises the vertical sync component of a television signal.

8. A servo system as defined in claim 4 wherein said control means further includes delay means interconnected between said converting means and said second comparing means for introducing a delay corresponding to the lead introduced by said presetting means.

9. A servo as defined in claim 2 wherein said control means further includes means for presetting said dividing means with a preselected count immediately following said predetermined count, said preselected count corresponding with a preselected phase lead with respect to said second standard rate signal.

10. A servo system for a capstan drive motor for use in a television recording and reproducing apparatus comprising:

drive means for providing power to said drive motor;

tachometer means operatively connected to a drive motor and providing train of pulses having a rate indicative of the speed of operation thereof;

discriminator means operatively connected to said tachometer means and providing an error signal to said drive means, said error signal decreasing as the speed of said motor increases to a predetermined operating speed during start-up thereof;

means for disconnecting said discriminating means when said drive motor has reached said predetermined operating speed;

means for providing a reference train of pulses whose rate is nominally equal to a multiple of the vertical rate of the television signal;

said reference producing means including a clock signal producing means for producing a train of pulses related in time to the horizontal synchronizing pulses of the television signal and having a rate that is a multiple of the horizontal rate of the television signal, and means coupled to said clock signal producing means for dividing the rate of clock pulses to the nominal rate of the reference signal;

first comparing means operatively connected to said tachometer means for comparing the rate of said tachometer pulses and said reference pulses and providing a first error signal indicative of the time difference therebetween;

means electrically coupling said first error signal of said comparing means to said drive means for providing a motor speed such that the reference pulses and the tachometer pulses are locked in synchronism;

second comparing means coupled to said tachometer means for comparing the timing of said tachometer pulses with the timing of the vertical pulses in the television signal and providing a second error signal in response to time variations between the two signals, and means coupled to said dividing means for adding or subtracting clock pulses therein in accordance with said second error signal to thereby adjust the timing of said reference pulses whereby said head motor phase errors that can be caused by temperature variation, drift, loading of the drive motor and the like are corrected.

* * * * *